Oct. 15, 1968 W. W. WEBSTER, JR 3,405,708
BLOOD FLOW MEASURING APPARATUS
Filed July 15, 1965

INVENTOR.
WILTON W. WEBSTER, Jr.
BY
Christie, Parker & Hale
ATTORNEYS.

United States Patent Office 3,405,708
Patented Oct. 15, 1968

3,405,708
BLOOD FLOW MEASURING APPARATUS
Wilton W. Webster, Jr., 1388 Crest Drive,
Altadena, Calif. 91001
Filed July 15, 1965, Ser. No. 472,240
7 Claims. (Cl. 128—2.05)

ABSTRACT OF THE DISCLOSURE

This invention describes a probe for measuring the rate of flow of blood in a blood vessel. The end of the probe is relatively flexible and resilient and is formed into an essentially S-shaped reversely curved form. A thermistor is disposed at about the midpoint of the S-shaped curvature. The curvature of the end of the probe assures that the thermistor is centered along the axis of the vessel rather than being disposed adjacent to a wall of the vessel, with the result that the flow characteristics of blood past the thermistor are predictable and the total rate of flow of blood through the blood vessel may be determined with accuracy.

---

This invention relates to apparatus for measuring the volumetric rate of flow of a liquid in a duct and, more particularly, to apparatus for measuring the rate at which blood flows through a blood vessel.

There exists a need for apparatus which enables the accurate measurement of the velocity and mass flowrate of blood in the blood vessels of a human. Such a device will provide data which are extremely useful in a surgery, in the diagnosis and treatment of circulatory diseases and defects, and in medical research. At the present time, there are available devices which provide measurements of the velocity of blood flow at the point in a blood vessel at which a sensing probe of the device is disposed. Existing devices if usable within a blood vessel do not provide accurate measurements of the mass flowrate of the blood through the vessel, or, as with magnetic devices, require surgery to place them in their proper positions.

This invention provides a novel, simple, effective, and efficient device for obtaining accurate measurements of blood flow velocity and volumetric flowrate at substantially any point desired in the circulatory system of a human. The device includes a sensing device which is adapted to be disposed in the blood vessel and which produces a signal indicative of the velocity of blood flow past it. The sensing device is mounted in a probe which is constructed and arranged so that, when it is engaged in a blood vessel, the sensing device is positioned at the center of the blood vessel, regardless of the size of the blood vessel. Since the flow characteristic of blood through a blood vessel is one of laminar flow, the volumetric flowrate of blood through the vessel may be determined if the diameter of the vessel and the velocity of blood flow along the center of the vessel are known. This invention also provides means whereby the internal diameter of the blood vessel at the location in which the sensing device is disposed may be conveniently and accurately determined.

Generally speaking, this invention provides apparatus for measuring the blood flowrate in a blood vessel and includes a slender, flexible probe member having an end and adapted to be disposed within a blood vessel. The probe member adjacent the end thereof is deformably and yet resiliently curved and recurved at two spaced locations so that the probe member has a portion spaced from the end thereof which is inclined to the elongate extent of the probe member. The probe member also has a terminal portion which extends between the inclined portion and the end of the probe member substantially parallel to the elongate extent of the probe member. An electrical temperature responsive sensing device is mounted in the probe substantially at the midlength of the inclined portion. The apparatus also includes means coupled to the sensing device and adapted for coupling the sensing device to a mechanism for indicating any change in the condition of the sensing device.

In a presently preferred embodiment of the invention, the temperature sensing device is comprised of a pair of thermistors. Thermistors have the property that their impedance, specifically their resistance, varies with their temperature. Preferably, the means for indicating a change in the condition of the sensing device is a Wheatstone bridge circuit.

The above mentioned and other features of the present invention are more fully set forth in the following detailed description of the invention presented in conjunction with the accompanying drawings, wherein.

Figure 1:
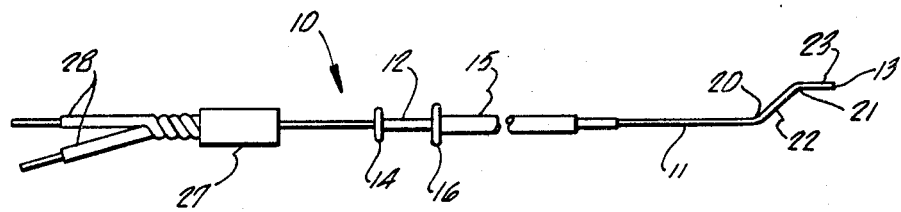
FIG. 1 is an elevation view of a blood flow measuring device according to this invention.

A blood flowrate measuring device 10 according to this invention, as shown in FIG. 1, includes an elongated, slender, flexible probe member 11. The probe member is fabricated of a material which is deformable and yet has inherent resiliency. In a presently preferred embodiment of the invention, the probe member is fabricated from a 45 inch long length of tetrafluoroethylene tubing having an outer diameter of .030 inch, and an inner diameter of .015 inch.

It should be understood, however, that this invention is not restricted to the use of tetrafluoroethylene for the construction of the probe member; any material which has local resiliency and yet is easily deformable, and which is chemically inert in the presence of blood, may be used. Further, the material from which the probe member is fabricated should be strong, soft, and flexible and a tube of such material should not expand diametrically when subjected to axial compression.

The probe member extends through and from the opposite ends of an elongate flexible radio-opaque sleeve 12, preferably fabricated of polyethylene tubing, and is slidable within the sleeve. The probe member has a sensing or terminal end 13. The end of sleeve 12 which is opposite from the sensing end of the probe member defines a bell 14. The end of sleeve 12 opposite bell 14 defines a resiliently deformable curve away from the length of the remainder of the sleeve when the end is disposed outwardly of sleeve 15. Sleeve 12 extends through and from the opposite ends of a tubular sleeve member 15, also preferably fabricated of radio-opaque polyethylene tubing, which defines a bell 16 adjacent the bell of sleeve 12. The sleeves are slidable axially of each other, and bells 14 and 16 limit the movement of sleeve 12 within sleeve 15 toward the sensing end of the probe member. Sleeve 12 preferably has the length of about 39 inches, and the length of sleeve 15 preferably is about 35 inches. The sleeves facilitate the insertion of the probe member into and along a blood vessel so that the sensing end of the probe member may be positioned at the desired location in the blood vessel.

Figure 2:
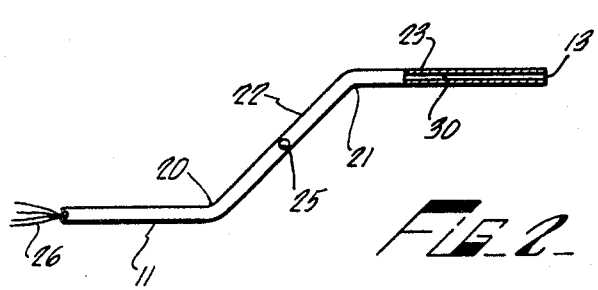
FIG. 2 is an enlarged elevation view of the end of the flexible probe of the device illustrated in FIG. 1.

As shown in FIGS. 1 and 2, the probe member defines a first obtusely angled bend 20 adjacent the sensing end of the probe member. Preferably the first bend has a value of about 135°. Also, the probe member defines a second obtusely angled bend 21. Bend 21 preferably lies more toward end 13 than toward bend 20 and also has a value of about 135° in the preferred embodiment of the invention illustrated. Accordingly, the probe member has an inclined portion 22 which is inclined to the elongate extent of the probe member opposite bend 20 from end 13. Bends 20 and 21 are arranged relative to each other so that the probe member has a terminal portion 23, between bend 21 and end 13, which is substantially parallel to the extent of the probe member opposite bend 20. Since the probe member is fabricated from a material which has inherent resiliency, the probe member may be deformed at the bends, but when the deforming forces are removed the probe member will return to its normal unstressed shape.

Probes according to the present invention are provided in different sizes for use with different ranges of blood vessel diameters. Probes for use with each range of blood vessel diameter have a characteristic length of inclined portion 22.

A pair of temperature responsive electrical sensing devices 25 are mounted in the probe member substantially midway along the length of inclined portion 22, i.e., substantially midway between obtusely angled bends 20 and 21. It is preferred that the sensing devices have the characteristics that their impedance varies in relation to the temperature of the sensing devices. In a presently preferred embodiment of this invention, the sensing devices 25 are thermistors. Thermistors are very small devices fabricated of semi-conductor material and have the characteristic that the logarithms of their resistivity vary substantially linearly as a function of temperature. It is preferred that a thermistor used in the present invention have a negative temperature response characteristic, so that its resistance increases with decreasing temperature. It should be understood, however, that sensing devices other than devices of the variable impedance type may be used in apparatus according to this invention without departing from the scope of the invention. For example, the sensing device carried by the probe member may be a self-heatable thermocouple.

Figure 4:
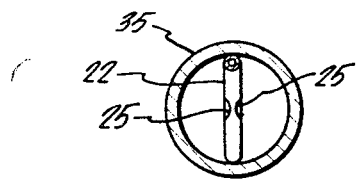
FIG. 4 is a cross-sectional elevational view taken along line IV—IV of FIG. 3.

Each thermistor is disposed in a small hole (not shown) through the wall of the tubing from which probe member 11 is fabricated. As shown in FIG. 4, the thermistors are exposed to opposite exterior sides of the probe member so that they are close to the blood which flows past the probe member when it is in use. Any openings around the thermistors into the interior of the probe member are closed by a suitable sealant. A pair of conductors 26 are connected to each thermistor and extend along the interior of the probe member to a connector 27 which is secured to the end of the probe member remote from end 13. Within the connector, conductors 26 are coupled to a pair of conductors 28 so that the thermistors are coupled in parallel with each other.

A quantity 30 of a material opaque to X-rays is disposed in terminal portion 23 of the probe member. Preferably quantity 30 is fabricated of lead. The quantity is provided so that precise placement of the sensing end of the probe member at a desired location along a blood vessel can be accomplished by means of a fluoroscope or the like.

In use, the probe member is inserted into a blood vessel and is positioned so that the thermistors are disposed at a predetermined desired location along the blood vessel. In views of the length and flexibility of the probe member, the probe member may be inserted into the vessel at a location spaced from the position at which the blood flowrate measurement is to be taken.

Figure 3:
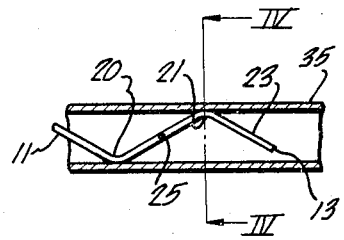
FIG. 3 is an enlarged cross-sectional elevation view showing the probe positioned in a blood vessel.

FIGS. 3 and 4 illustrate the disposition of the probe member in a blood vessel 35. The normal or unstressed condition of the probe member adjacent the sensing device is such that the probe member must be deformed or straightened somewhat before it can be inserted into a blood vessel. The height of the hump defined by bend 21 relative to bend 20 is greater than the inner diameter of most blood vessels in the human body. Therefore, the probe member is pulled axially of sleeve 12 until the sensing end of the probe member is either in sleeve 12 or is a short distance outwardly of the sleeve. The sleeve is then inserted into and along the vessel until the end of the probe member is at the desired location; the curved end of the sleeve facilitates steering the sleeve along an artery or vein and into the desired vessel through one or more vessel junctions. Once the end of sleeve 12 is near the desired location of the probe, the sleeve is held stationary and the probe is extended into its desired position. The probe member, because of its inherent resiliency, tends to return to the configuration shown in FIG. 2 once it clears the end of sleeve 12, but is prevented from a complete return to such a configuration by the engagement of bends 20 and 21 with the interior surfaces of the blood vessel, as shown in FIG. 3. Thus, the inclined portion of the probe member, as a result of the cooperation between the configuration of the probe member and the blood vessel itself, is positioned diametrically across the blood vessel as shown in FIG. 4. Since the thermistors are disposed midway between bends 20 and 21, the thermistors are positioned at the center of the blood vessel.

It is known that the rate at which heat is transferred from a heated body disposed in a fluid is dependent upon the temperature of the body, the temperature of the fluid, the thermal conductivity of the fluid, and the rate at which the fluid moves past the body. Thus, if the temperatures of the body and the fluid and the rate of heat transfer from the body to the fluid are known, the velocity of the particular fluid past the heated body may be determined, the thermal conductivity of the fluid being known.

It is also known that blood flows through the blood vessels of man in laminar flow. When the flow of fluid through a duct is laminar, the fluid flows fastest along the center of the duct. The flow velocity decreases, according to known relationships, to substantially zero along the walls of the duct. If the viscosity of the fluid, the diameter of the duct, and the maximum flow velocity are known, then the volumetric rate of flow of the liquid through the duct may be determined.

Measuring device 10 is operated by energizing the sensing device to cause it to heat. The energy applied to the sensing device is such that the sensing device will be heated to a predetermined temperature if the sensing device is disposed in noncirculating fluid at a given temperature. Since thermistors are used in device 10, a predetermined electrical current is passed through the thermistors to cause the thermistors to heat to a temperature which would result in the thermistor having a predetermined resistance if there were no blood flowing past the thermistors. However, because blood is moving through the vessel 35 past the thermistors, the heat generated in the thermistors by the current flowing through it is extracted from the thermistors by the blood. The result is that the thermistors are not heated to the predetermined temperature. The difference between the actual temperature of the thermistors and the predetermined temperature is attributable solely to the velocity of the blood stream and, thus, this difference is a measure of the velocity of the blood past the thermistor. Because the thermistors are located centrally of the vessel, it is seen that device 10 provides an apparatus for obtaining an accurate measurement of the maximum velocity at which blood flows laminarly through blood vessel 35.

A fluoroscope machine is normally used so that the exact position of the terminal end of probe member 11 in a patient's body may be determined with accuracy. Since a fluoroscope is used, it is a simple matter to determine the diameter of the vessel at the time the probe is positioned in the vessel by means of radio-opaque or fluorescing dye injected into the blood stream through sleeve 15. Thus, since the diameter of the blood vessel and the maximum velocity of the blood flowing through the vessel are known, the volumetric flowrate of the blood through the vessel may be determined with precision. The temperature of the blood may be found by conventional procedures.

Figure 5:
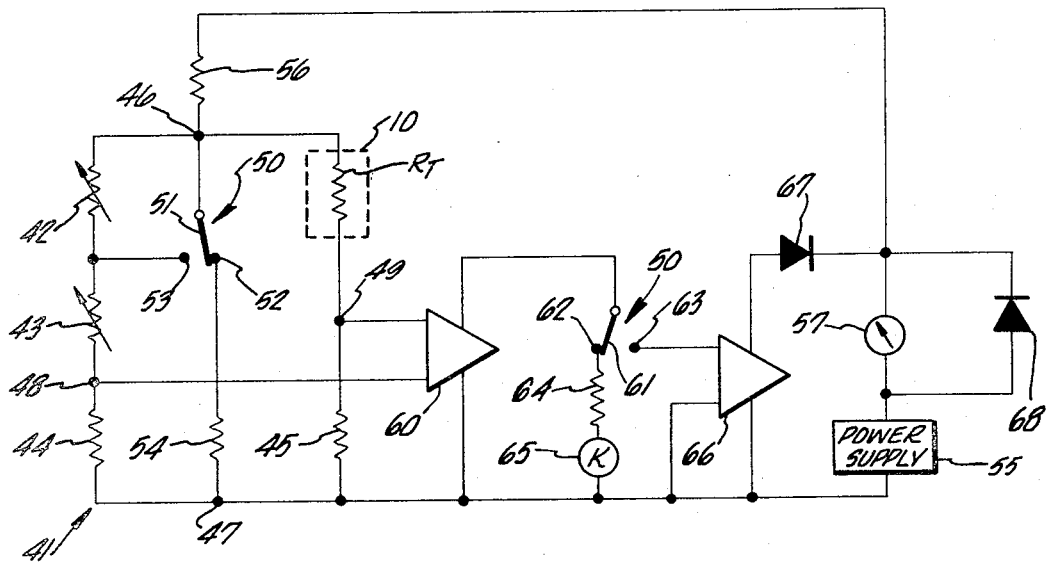
FIG. 5 is an electrical schematic diagram of a circuit with which the device shown in FIG. 1 has utility for measuring flow in a blood vessel.

FIG. 5 illustrates, in schematic form, a readout device 40 with which measuring device 10 may be used to provide accurate measurements of blood flowrate in a blood vessel. Device 40 includes a Wheatstone bridge circuit 41 comprised of impedances (resistances) 42–45 and $R_T$. $R_T$ is the impedance of the thermistors in the probe member of measuring device 10. Series connected impedances 42 and 43 form one leg of bridge circuit 41, and impedances 44 and 45, preferably of equal value, form two additional legs of the bridge circuit. Device 10 is coupled into circuit 41 so that it forms the fourth leg of the bridge circuit. The bridge circuit has input terminals 46 and 47 connected between impedances 42 and $R_T$ and between impedances 44 and 45, respectively. The bridge circuit also has output terminals 48 and 49 connected between impedances 43 and 44 and between impedances 45 and $R_T$, respectively. A switch 50 has a movable contact 51 thereof connected to input terminal 46 and has stationary contacts 52 and 53 with which the movable contact cooperates. Contact 52 is connected to input terminal 47 via a load impedance 54. Contact 53 is connected between impedances 42 and 43 so that impedance 42 is shunted out of the bridge circuit when switch contacts 51 and 53 are engaged. A power supply 55, having a constant output potential of known value, is coupled across the bridge input terminals via a load impedance 56. A meter 57 is connected in series with the power supply. Preferably the power supply is an emitter follower regulated power supply; such power supplies are known and thus the details thereof are not described.

An amplifier 60 is connected across the output terminals of the bridge circuit for amplifying the signal produced between the bridge output terminals. The amplifier has an output which corresponds to the imbalance of the bridge circuit. The output of amplifier 60 is presented to a second movable contact 61 of switch 50. When contact 51 engages contact 52, contact 61 engages a contact 62 which is coupled, via a series connected impedance 64 and a null meter 65, to the common connection between bridge input terminal 47 and power supply 55. When contact 51 engages contact 53, contact 61 engages a contact 63 of the switch which is coupled to one of the input terminals of a second amplifier 66; the other input terminal of amplifier 66 is connected to the common connection. The output of amplifier 66 is connected to the connection between meter 57 and load impedance 56 via a rectifier 67. A second rectifier 68 is coupled across meter 57 as a meter protector.

After measuring device 10 is connected to readout device 40, the readout device is adjusted or calibrated so that the effect of the body temperature of a person in whose body probe member 11 is engaged is eliminated from the measurement ultimately obtained. The readout device is adjusted by operating switch 50 so that contacts 51 and 61 engages contacts 52 and 62, respectively. Impedance 54, then coupled across the bridge input terminals, has a low value relative to the bridge impedance with the result that little current flows through the thermistors in measuring device 10. Accordingly, the self-heat of the thermistors is negligible and their resistance is attributable essentially to the body temperature of the subject. Variable impedance 43 is adjusted so that null meter 65 shows a condition of bridge balance.

To obtain a measurement of maximum blood flow velocity at a desired point in the circulatory system of the subject, switch 50 is operated so that contacts 51 and 61 engage contacts 53 and 63, respectively, thereby removing impedances 42 and 54 from the bridge circuit and coupling the output of amplifier 60 to the input of amplifier 66. When impedance 54 is removed from its connection across the bridge input terminals, the amount of current which flows through the thermistors is increased and the thermistors are heated. The value of impedance 42 has previously been adjusted so that, upon the removal of impedances 42 and 54 from the bridge circuit, the bridge will continue to be balanced by the power supplied by amplifier 66 (assuming the amplifier develops the same output as the power supply) if the thermistors are heated to a predetermined temperature, it being known that the value of $R_T$ will decrease as the thermistors are heated. The predetermined temperature is selected to be higher than the body temperature of the subject so that the heat generated in the thermistors will be removed therefrom by the flood flowing past the thermistors. Accordingly, amplifier 66 must develop an output greater than that previously supplied by the power supply to balance the bridge when switch 50 was in its other condition. This condition is met since the output of amplifier 66 is determined by the amount of unbalance in the bridge. Amplifiers 60 and 66 thus drive the bridge into a balanced condition by heating the thermistors to the predetermined temperature. The difference between the power required to maintain the thermistors at the predetermined temperature and the power previously required to balance the bridge is a measure of the velocity of blood flow past the thermistors. This difference is measured by meter 57. Power supply 55, during this mode of operation of measuring device 40, relative to the amplifier 66, appears as a constant voltage drop in series with meter 57. As a result, the range over which meter 57 must be effective is small and the precision of the reading provided by the meter is great. Thus, meter 57 provides a measure of blood flow velocity. Preferably the meter is calibrated so that it reads directly in terms of blood flow velocity.

Since the thermistors are located centrally of the blood vessel, the reading provided by meter 57 is a maximum blood flow velocity. Also, the size of the blood vessel was found when the thermistors were positioned. Thus, only a simple calculation is required to determine the volumetric flowrate of blood past the thermistors. If desired, meter 57 may carry a plurality of scales, each one of which is graduated to indicate volumetric blood flowrate through a vessel of given interior diameter. With such a meter, the blood flow velocity and volumetric flowrate may be read directly or by interpolation between appropriate scales.

It will be understood that the readout device 40 described above is especially adapted for use with a measuring device wherein thermistors are used as the sensing devices. Workers skilled in the art will appreciate that readout devices of different construction will be useful where other types of sensing devices are used.

There has been described above a novel, simple, effective and efficient apparatus for obtaining precise measurements of blood flow velocity and volumetric flowrate in a human subject. The description of such apparatus has been presented by reference to a presently preferred embodiment of the invention. Thus, the structure and arrangements described have been set forth as examples rather than as limitations of the present invention and the foregoing should be so understood since such structure and arrangements may be modified without departing from the scope of this invention.

What is claimed is:

1. Apparatus for measuring blood flowrate in a blood vessel comprising a slender flexible probe member having an end adapted to be disposed within a blood vessel, the probe member adjacent the end thereof being deformably yet resiliently curved and recurved at spaced locations to define a portion of the probe member which is spaced from said end and inclined to the elongate extent of the probe member and to defined a terminal portion extending between the inclined portion and the end of the probe member substantially parallel to the elongate extent of the probe member, an electrical temperature responsive sensing device mounted in the probe substantially at the midlength of the inclined portion, and means coupled to the sensing device adapted for coupling the sensing device to means for indicating any change in the impedance of the sensing device.

2. Apparatus for measuring blood flowrate in a blood vessel comprising a slender flexible probe member having an end adapted to be disposed within a blood vessel, the probe member adjacent the end thereof being deformably yet resiliently curved and recurved at spaced locations to define a portion of the probe member which is spaced from said end and inclined to the elongate extent of the probe member and to define a terminal portion extending between the inclined portion and the end of the probe member substantially parallel to the elongate extent of the probe member, a variable impedance electrical temperature sensing device mounted in the probe substantially at the midlength of the inclined portion, the impedance of the sensing device varying in relation to its temperature, and means coupled to the sensing device adapted for coupling the sensing device to means for indicating any change in the impedance of the sensing device.

3. Apparatus for measuring blood flowrate in a blood vessel comprising an elongate slender flexible probe member having an end adapted to be disposed within a blood vessel, the probe member adjacent the end thereof being deformably yet resiliently curved and recurved at spaced locations to define a portion of the probe member which is spaced from said end and inclined to the elongate extent of the probe member and to define a terminal portion substantially as long as the inclined portion extending between the inclined portion and the end of the probe member substantially parallel to the elongate extent of the probe member, a variable impedance electrical temperature sensing device mounted in the probe proximate to the exterior thereof substantially at the midlength of the inclined portion, the impedance of the sensing device varying in relation to its temperature, and means coupled to the sensing device adapted for coupling the sensing device to means for indicating any change in the impedance of the sensing device, the curves of the probe member at the end of the inclined portion engaging the inner surfaces of a blood vessel when the probe member is inserted thereinto and adapting to the diameter of the vessel so that the inclined portion of the probe member extends obliquely across the vessel and so that the sensing device is positioned in the center of the vessel.

4. Apparatus for measuring the blood flowrate in a blood vessel comprising an elongate slender hollow probe member having an end, the probe member being fabricated of a deformable material having inherent resiliency, the probe member adjacent to but spaced from the end thereof defining a first obtusely angled bend therein and a second obtusely angled bend at a location substantially midway between the first bend and the end, the probe member between the second bend and the end normally being substantially parallel to the elongate extent of the probe member opposite the first bend from the end, a pair of variable impedance electrical sensing devices mounted in the probe member substantially midway between the bends and exposed to opposite exterior surfaces of the probe member, and means coupled to the sensing deviecs adapted at a location spaced therefrom for coupling the sensing devices to means for indicating any change in the impedance of the sensing device.

5. Apparatus for measuring the blood flowrate in a blood vessel comprising an elongate slender hollow probe member having an end, the probe member being fabricated of a deformable material having inherent resiliency, an elongate tubular sleeve of length less than the length of the probe member slidably journalling the probe member, the probe member adjacent to but spaced from the end thereof defining a first obtusely angled bend therein and a second obtusely angled bend at a location substantially midway between the first bend and the end, the probe member between the second bend and the end normally being substantially parallel to the elongate extent of the probe member opposite the first bend from the end, a pair of thermistors mounted in the probe member substantially midway between the bends and exposed to opposite exterior surfaces of the probe member, an impedance bridge circuit, means coupling the thermistors into the bridge circuit so as to define one leg of the bridge circuit, and means coupled to the bridge circuit for indicating any condition of bridge unbalance due to a change in the impedance of the one leg thereof.

6. Apparatus according to claim 5 including a member opaque to X-rays disposed in the probe member between the second bend and the end thereof.

7. Apparatus according to claim 5 wherein the bridge circuit is a Wheatstone bridge circuit including a power supply connected across one diagonal thereof and an amplifier having a pair of inputs coupled across the other diagonal, the power supply being coupled in parallel with the bridge across the output of the amplifier.

References Cited

UNITED STATES PATENTS

| | | | |
|---|---|---|---|
| 2,949,910 | 8/1960 | Brown et al. | 128—2.05 |
| 3,075,515 | 1/1963 | Richards | 128—2.05 |
| 3,336,918 | 8/1967 | Jeckel | 128—2.05 |

RICHARD A. GAUDET, *Primary Examiner.*

S. BRODER, *Assistant Examiner.*